(12) United States Patent
Schimmelpfeng et al.

(10) Patent No.: US 9,727,666 B2
(45) Date of Patent: Aug. 8, 2017

(54) DATA STORE QUERY

(71) Applicant: HEWLETT PACKARD ENTERPRISE DEVELOPMENT LP, Houston, TX (US)

(72) Inventors: Joern Schimmelpfeng, Herrenberg (DE); Radi Dimitrov Hadzhiyski, Boeblingen (DE)

(73) Assignee: ENTIT SOFTWARE LLC, Sunnyvale, CA (US)

(*) Notice: Subject to any disclaimer, the term of this patent is extended or adjusted under 35 U.S.C. 154(b) by 209 days.

(21) Appl. No.: 14/266,238

(22) Filed: Apr. 30, 2014

(65) Prior Publication Data

US 2015/0317355 A1    Nov. 5, 2015

(51) Int. Cl.
*G06F 17/30* (2006.01)
*G06F 11/07* (2006.01)

(52) U.S. Cl.
CPC ...... *G06F 17/30997* (2013.01); *G06F 11/079* (2013.01); *G06F 11/0727* (2013.01); *G06F 17/30144* (2013.01); *G06F 17/30401* (2013.01); *G06F 17/30864* (2013.01)

(58) Field of Classification Search
CPC ......... G06F 17/30997; G06F 17/30401; G06F 17/30864; G06F 17/30144
See application file for complete search history.

(56) References Cited

U.S. PATENT DOCUMENTS

| | | |
|---|---|---|
| 8,306,967 B2 | 11/2012 | Galitsky et al. |
| 8,370,329 B2 | 2/2013 | Gutt et al. |
| 8,510,328 B1 | 8/2013 | Hatton |
| 8,639,679 B1 | 1/2014 | Zhou |
| 9,235,654 B1 | 1/2016 | Gupta et al. |
| 2008/0071771 A1 | 3/2008 | Venkataraman |
| 2009/0037956 A1 | 2/2009 | Bennett |
| 2009/0043741 A1 | 2/2009 | Kim |
| 2010/0228376 A1 | 9/2010 | Stafford et al. |
| 2011/0106614 A1 | 5/2011 | Ramer |
| 2012/0005542 A1* | 1/2012 | Petersen et al. ............ 714/48 |
| 2012/0185507 A1 | 7/2012 | Paparizos et al. |
| 2013/0041878 A1 | 2/2013 | Satyanarayana et al. |
| 2013/0046777 A1 | 2/2013 | Mohiuddin et al. |
| 2013/0262485 A1 | 10/2013 | Li et al. |

OTHER PUBLICATIONS

Seyed-Mehdi-Reza Beheshti, et al., A Query Language for Analyzing Business Processes Execution, Jun. 12, 2011, 16 pages.
Szaboles Rozsnyai, et al., SARI-SQL: Event Query Language for Event Analysis, Dec. 15, 2009, 12 pages.

(Continued)

*Primary Examiner* — Robert Beausoliel, Jr.
*Assistant Examiner* — Hau H Hoang
(74) *Attorney, Agent, or Firm* — Mannava & Kang, P.C.

(57) ABSTRACT

Querying a data store can include receiving a query defined by a number of phrases. Querying a data store can include identifying within the data store service component metrics, service component logs, and service component events associated with the query. Querying a data store can include displaying the identified service component metrics, service component logs, and service component events.

15 Claims, 4 Drawing Sheets

(56) References Cited

OTHER PUBLICATIONS

Dongdong Shan, et al., EventSearch: A System for Event Discovery and Retrieval on Multi-Type Historical Data, KDD'12 Beijing, China, Aug. 12-16, 2012, 4 pages.

Bhatia, S. et al., "Query Suggestions in the Absence of Query Logs," (Research Paper), Jul. 2011, 10 pages, available at http://www.cse.psu.edu/~sub194/papers/sigir11.pdf.

Hatlestad, K., "Autocomplete for Metadata in WebCenter Content," Dec. 30, 2011, 5 pages, available at http://www.ateam-oracle.com/autocomplete-for-metadata-in-webcenter-content/.

Shokouhi, M., "Learning to Personalize Query Auto-Completion," (Research Paper), Aug. 2013, 10 pages, available at http://research.microsoft.com/pubs/193319/SIGIR2013-Shokouhi-PersonalizedQAC.pdf.

Wikipedia, "Facebook Graph Search," (Web Page), Jan. 27, 2017, 6 pages, available at https://en.wikipedia.org/wiki/Facebook_Graph_Search.

\* cited by examiner

DATA STORE QUERY

BACKGROUND

A data store can accommodate large volumes of data overtime. For example, a data store can store and index a wide variety of performance data associated with operations of a number of services. The performance data can be useful in identifying problems with the number of services.

DETAILED DESCRIPTION

Figure 1:
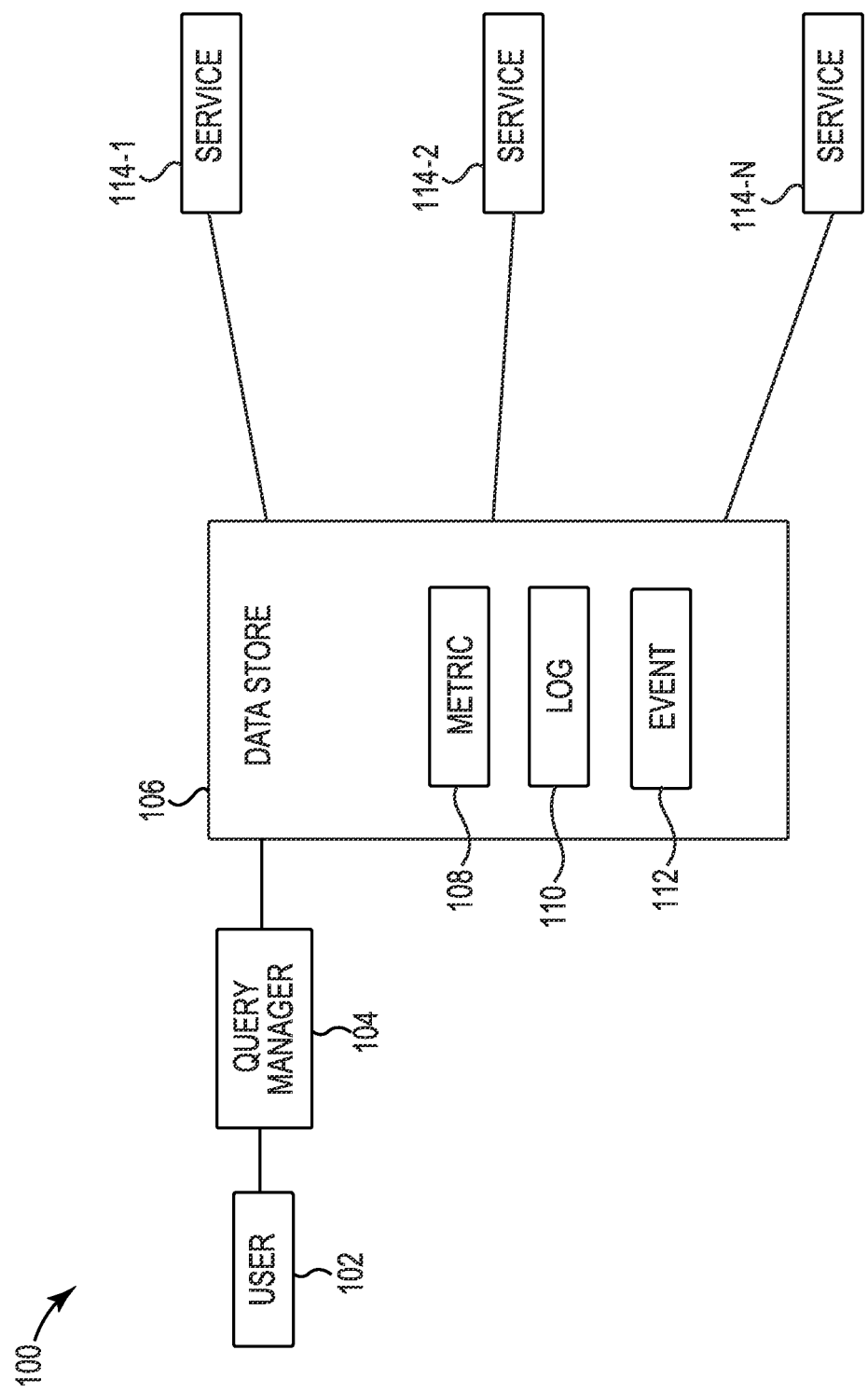
FIG. 1 illustrates an example environment for querying a data store according to the present disclosure.

A data store can be used to collect, store, and index data from diverse sources in diverse formats. As used herein, the term "data store" is meant to include a database, a database system (e.g., data, supporting data structures, a database management system), an XML file system, a data store area, a data source, and/or any organized collection of data. The data can include data associated with the operation of a number of information technology (IT) services. For example, the data can include data associated with the performance of a number of services accessed by a computing device (e.g., by a user computing device) in a computing network.

A data store including data associated with operation of a number of services can be a resource for identifying root causes of problems with those services. In identifying these root causes it can be useful to have a holistic view of all of the services and their relationships. For example, a problem observed in a service is not necessarily the root cause of the problem. That is, the symptom (e.g., a failure of a business report to be generated) is not necessarily the disease (e.g., a problem in an exchange server serving the sales reporting service). The root cause can be seemingly removed from the service and unsuspected. Providing a holistic view of the performance and/or relationships of a number of services can be useful in revealing the root cause of a problem observed in a service.

Managing a number of services including an array of constituent service components arranged in a complex web of relationships across an organization can include collecting, storing, and indexing a large amount of data overtime. For example, a data store can collect, store, and index thousands of types of metrics, logs, and events for hundreds of thousands of services utilized by an organization.

Accessing a data store containing this data to identify the root cause of an observed problem can include investigating and analyzing the data. In order to investigate and analyze such a large amount of data, an accessing device can benefit from having knowledge of all of the contents of the data store and the relationships between those contents (e.g., specific semantics, specific abbreviations, specific dependencies between service components, specific relationships between service components and services, etc.). However, the quantity of knowledge useful for fully utilizing the contents of a data store can present a practical limit to the useful amount of data collected, stored, and indexed by the data store. That is, a given a quantity of data can involve a given quantity of knowledge to usefully access and analyze that data and a given accessing computing device (e.g., user) can possess a limited amount of knowledge. Further, the knowledge requirement can limit the usefulness of the data store across multiple users. For example, multiple users across an organization can have different roles with different knowledge base requirements and responsibility areas. It becomes increasingly unlikely with large volumes of data store content that any specific user possesses the knowledge required to access and analyze the full data store.

In contrast, the embodiments of the present disclosure describe a system, method, and computer readable medium for querying a data store regardless of the scale of the data store and the accessible knowledge, e.g. data, of an accessing device.

FIG. 1 illustrates an example environment 100 for querying a data store 106. The environment 100 is shown to include a user 102, a query manager 104, a data store 106 including a metric 108, a log 110, an event 112, and services 114-1 . . . 114-N.

The environment can include an accessing device (e.g., a user 102, a user computing device receiving input from a user 102, other computing devices executing instructions, a network of computing devices executing instructions, etc.) from which to receive a data store query. The data store query can be captured from the accessing device. While the examples given herein use the term user 102 for ease of reference in describing the accessing device, the embodiments are not so limited.

An accessing device can include a user 102. The user 102 can include any entity querying a data store 106. The user 102 can include an affiliate of an organization that uses and/or provides a number of services 114-1 . . . 114-N. For example, the user can include an information technology (IT) specialist affiliated with a large organization that uses and/or provides services. The user 102 can include a user computing device and/or an input device (e.g., keyboard, mouse, touchscreen, etc.). The user computing device can be associated with the user 102 and can be used to transmit/receive data related to querying a data store 106 to a query manager 104. For example, a user computing device can be used to transmit a querying to a query manager 104.

A user profile (not shown) can be associated with a user 102. The user profile can include information related to characteristics of the user 102. Characteristics of the user 102 can include the user's 102 role within an organization, knowledge base, responsibility area, permissions, query history, etc.

The query manager 104 can be a data store management system including software, firmware and/or hardware for querying a data store 106. A query manager 104 can include instructions and/or commands for utilizing processing resources to perform a query of a data store 106. The query manager 104 can be stored on a user computing device, on the data store 106, and/or on another storage medium. The instructions of the query manager 104 can be executed by processing resources of a user computing device, by processing resources associated with the data store 106, and/or another processing resource. The query manager 104 can be a virtual appliance running on a virtual machine platform in a cloud system.

The query manager 104 can receive inputs and generate outputs (e.g., from/to the user 102, from/to the data store 106, from/to the service 114-1 . . . 114-N, etc.). For example the query manager 104 can receive a query of a data store 106. The query manager 104 can receive a query of a data store 106 from a user 102 as a completed query or in portions of a query. For example, the query manager 104 can incrementally receive characters comprising phrases defining a query. Additionally, the query manager 104 can receive one or more phrases comprising portions of a query. The phrases can include one or more words or word parts comprised of one or more characters.

The query manager 104 can receive a query in a phrased query language (PQL). A PQL query can include a natural language formatted query. That is, rather than a query precisely formatted to include the specific semantics, abbreviations, and paths corresponding to the data in the data store 106 (e.g., a strict Boolean Search, etc.), the PQL query can be formatted to include linguistic phenomenon common in written and/or spoken language. For example, the PQL query can be phrased the way a user 102 would ask a friend or colleague a question during conservation.

The query manager 104 can resolve the query based on analysis of the phrases it is comprised of. Analyzing and resolving the query can include identifying phrases, portions of phrases, and/or semantic properties of the phrases/portions of phrases. In this manner, meaning can be attributed to the query.

Furthermore, the query manager 104 can identify data (e.g., metrics 108, logs 110, and events 112) within the data store 106 associated with at least one of a number of phrases in a query. The query manager 104 can identify the data within the data store 106 associated with at least one of the phrases by identifying data within the data store 106 that matches the phrase. Data within the data store 106 that matches the phrase can be data that includes or is associated with phrases that are identical to or similar to a phrase included in the query. For example, the data within the data store 106 can include and/or be associated with meta information. Meta information can include the contents of the data, names of the data, key attributes, relationships, and/or tags associated with the data. Therefore, data within the data store 106 can be identified as matching at least one phrase in the query when the meta information includes a phrase identical and/or similar to the phrase in the query.

The data store can include unstructured, semi-structured, and structured data. The data can include metrics 108, logs 110, and events 112 related to services 114-1 . . . 114-N. The services 114-1 . . . 114-N can be IT systems that provide an IT function. The services 114-1 . . . 114-N can be applications associated with a variety of aspects of an organization such as managing organization data for a portion of an organization (e.g., a sales department, an IT department, a business analytics group, etc.). The services 114-1 . . . 114-N can be software, hardware, and/or firmware deployed on any resource. For example, the services 114-1 . . . 114-N can be deployed on the data store 106, on a user computing device, on a cloud system, and/or on any other resource from which the data store 106 can receive the data. The services 114-1 . . . 114-N can be made up of and/or utilize a number of constituent service components (e.g., hosting servers, exchange servers, databases, CPUs, etc.). For example, a service 114-1 . . . 114-N can be a system that monitors a sales service for an organization. Such a service 114-1 . . . 114-N can include and/or utilize a specific sales database, a specific exchange server, and/or various other constituent service components.

The data store 106 can include data received from monitoring the services 114-1 . . . 114-N and their corresponding constituent components. Additionally, the data store can include passively received data from the services 114-1 . . . 114-N. The services 114-1 . . . 114-N can additionally include monitoring and compiling applications that monitor the services 114-1 . . . 114-N and their corresponding constituent components and transmit the data to the data store 106. The data store 106 can receive the data in real time, near-real time, and or at intervals. The data store 106 can organize and index the data. Alternatively, the data store 106 can include the services 114-1 . . . 114-N. That is, the services 114-1 . . . 114-N themselves can be a queryable data source of the data store.

The data store 106 can be wholly or partially cloud based. For example, the data store 106 can include a public cloud system, a private cloud system, and/or a hybrid cloud system for storing, indexing, and/or organizing data. For example, an environment (e.g., IT environment) including a public cloud system and a private cloud system can include a hybrid environment and/or a hybrid cloud system. A public cloud system can include a service provider that makes computational resources (e.g., applications, storage, virtual machines, and/or data), available to the public over the Internet. A public cloud system can be free or offered for a fee, for example.

A private cloud system can include computing architecture that provides hosted services to a limited number of people behind a firewall. For example, a private cloud can include an Enterprise Resource Planning (ERP) system, a number of data stores, and virtualization (e.g., virtual machines). For instance, a private cloud system can include a computing architecture that provides hosted services to a limited number of a plurality of nodes (e.g., computers) behind a firewall. The ERP, for example, can integrate internal and external management information across an entire load test SaaS application, enterprise, and/or organization. A number of data stores can include an event data store, event archive, log data store, a metric data store, a semantic data store, a configuration management data store (CMDB), and/or a user profile/query history data store, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

A hybrid cloud, for example, can include a mix of traditional server systems, private cloud systems, public cloud systems, and/or dynamic cloud services. For instance, a hybrid cloud can involve interdependencies between physically and logically separated services consisting of multiple systems. A hybrid cloud, for example, can include a number of clouds (e.g., two clouds) that can remain unique entities but can be bound together.

The data store 106 can include a metric 108. The metric 108 can be related to a service 114-1 . . . 114-N (e.g., business metrics, market metrics, financial metrics key performance indicators related to business, etc.). The metric 108 can be data related to the performance (e.g., health, capacity, volume, input/output operations per second, transaction rates, available bandwidth, server downtime, etc.) of a service 114-1 . . . 114-N and/or its constituent service components. The metric 108 can include time series data including information about a service 114-1 . . . 114-N and/or its constituent service components. The metric 108 can be a type of metric 108 common to multiple services 114-1 . . . 114-N. That is, the data store 106 can store multiple metrics 108 of the same type for different services 114-1 . . . 114-N and/or service components, each individual metric 108 associated with a specific instance of a service component.

The data store 106 can include a log 110. The log 110 can be related to a service 114-1 . . . 114-N. The log 110 can be data related to the performance of a service 114-1 . . . 114-N and/or its constituent service components. The log 110 can include data including information about a service 114-1 . . . 114-N and/or its constituent service components. The log 110 can be associated with a specific instance of a service component. The log 110 can include a listing of particular actions that have occurred with respect to a service 114-1 . . . 114-N and/or its constituent service components. The log 110 can be a processed and logged event 112.

The data store 106 can include an event 112. The event 112 can be related to a service 114-1 . . . 114-N. The event 112 can be data related to the performance of a service 114-1 . . . 114-N and/or its constituent service components. The event 112 can include data including information about a service 114-1 . . . 114-N and/or its constituent service components. The event 112 can be an action that has occurred with respect to a service 114-1 . . . 114-N and/or its constituent service components but that has not been processed and logged as a log 110. The event 112 can be generated in response to an action occurring. For example, a service database can begin to experience a problem rendering it unavailable for use by the corresponding service 114-1 . . . 114-N. In response to detecting the problem, an event 112 can be generated indicating the service database is experiencing a problem.

The metric 108, log 110, and/or event 112 can each include meta information. The meta information can include a tag. A tag can include a tag phrase (e.g., characters, words, and/or word parts). The tag phrase can describe the service 114-1 . . . 114-N, the service component, the metric, the metric type, the log, the log type, the event, and/or the event type with which the particular metric 108, log 110, and/or event 112 is associated.

The metric 108, log 110, and/or event 112 can manually or automatically receive a tag. For example, when a new service 114-1 . . . 114-N is added as a data source for the data store 106 it can be registered. Registration can include designating a metric 108 (e.g., a service component metric associated with a constituent component of a service 114-1 . . . 114-N), a log 110 (e.g., a service component log associated with a constituent component of a service 114-1 . . . 114-N), and/or an event 112 (e.g., a service component event associated with a constituent component of a service 114-1 . . . 114-N) that will be associated with the service 114-1 . . . 114-N and how those metrics 108, logs 110, and/or events 112 should be tagged.

The meta information of the metric 108, log 110, and/or event 112 can additionally include a key attribute. A key attribute can include a phrase that identifies a specific instance and/or set of instances of a service component metric 108, service component log 110, and/or service component event 112. A key attribute can include a phrase that identifies a specific instance of a specific service component of a specific service 114-1 . . . 114-N associated with a particular metric 108, log 110, and/or event 112. For example, if a metric 108 for a particular service 114-1 . . . 114-N is called "disk_io_rate" then the tags for the metric 108 can be "disk" and "io" and the key attribute can be a particular host name (e.g., host_1) identifying the particular instance associated with the metric.

Responsive to receiving a query of the data store 106, the query manager 104 can identify a metric 108 (e.g., a service component metric associated with a constituent component of a service 114-1 . . . 114-N), a log 110 (e.g., a service component log associated with a constituent component of a service 114-1 . . . 114-N), and/or a event 112 (e.g., a service component event associated with a constituent component of a service 114-1 . . . 114-N) associated with a phrase included in the query. The query manager 104 can identify the metric 108, log 110, and/or event 112 associated with the phrase by identifying a metric 108, log 110, and/or event 112 with meta information (e.g., contents of the metric 108, log 110, and/or event 112; names of the metric 108, log 110, and/or event 112; relationships of the metric 108, log 110, and/or event 112; key attributes of the metric 108, log 110, and/or event 112; and/or tags associated with the metric 108, log 110, and/or event 112) including a phrase matching the phrase included in the query.

Where more than one phrase is present in the query of the data store 106, the query manager 104 can identify a metric 108, log 110, and/or event 112 associated with all or a portion of all phrases in the query. The query manager 104 can identify a metric 108, log 110, and/or event 112 with meta information matching all or a portion of all phrases in the query. For example, if the query includes the phrases "disk" and "io" then a metric 108 with meta information including the phrase "disk_io_rate" can be identified as matching the query phrases. The query manager 104 can also identify a second metric 108 with meta information including the phrase "disk_responsetime" since it matches the query phrase "disk." However, query manager 104 can identify the second metric 108 as a secondary (e.g., less relevant and/or less likely to satisfy the query than a metric matching more of the phrases in the query) metric for purposes of sorting the identified metric 108 for display. The query manager 104 can sort (e.g., order) a number of identified metrics 108, logs 110, and/or events 112 in this manner. For example, identified metrics 108, logs 110, and/or events 112 having corresponding meta information matching a greater amount of a number of phrases in the query can be ordered to appear earlier in a sort.

The query manager 104 can additionally identify the metrics 108, logs 110, and/or events 112 associated with a phrases included in a query of a data store 106 based, at least in part, on relationships amongst the metrics 108, logs 110, and/or events 112. For example, a metric 108, log 110, and/or event 112 can be identified despite not themselves matching any and/or all of the number of phrases included in a query of a data store 106 if they are related to metrics 108, logs 110, and/or events 112 matching a number of phrases included in a query of a data store 106.

Additionally, the query manager 104 can identify the metrics 108, logs 110, and/or events 112 associated with a phrase included in a query of a data store 106 based, at least in part, on relationships between the metrics 108, logs 110, and/or events 112 and the services 114-1 . . . 114-N. For example, metrics 108, logs 110, and/or events 112 that are related to a service 114-1 . . . 114-N and/or its constituent service components matching a phrase included in a query of a data store 106 can be identified despite not themselves matching any and/or all of a phrase included in a query of a data store 106.

Identifying metrics 108, logs 110, and/or events 112 based on their relationships with one another and/or their relationships with a service 114-1 ... 114-N and/or its constituent service components can include analyzing a topological mapping of the relationships stored in a semantics data store. A semantics data store can include data stored as triples (e.g., Object A, some Relation, Object B) that describes how objects are linked together. For example, the semantics data store can be a configuration management database (CMDB). The semantics data store can be part of the data store 106 or can be separate from the data store 106. The semantics data store can provide a topological mapping of the relationships of the metrics 108, logs 110, and/or events 112 with one another and/or their relationships with a service 114-1 ... 114-N and/or its constituent service components based on a predefinition of the relationships and/or analysis of their various dependencies.

The query manager 104 can sort a number of identified metrics 108, logs 110, and/or events 112 based on their relationships with one another and/or their relationships with a service 114-1 ... 114-N and/or its constituent service components. For example, identified metrics 108, logs 110, and/or events 112 can match a phrase included in a query of a data store 106. The identified metrics 108, logs 110, and/or events 112 can have relationships with other metrics 108, logs 110, and/or events 112 that don't match the phrase or match fewer of a number of phrases. The query manager 104 can sort the related metrics 108, logs 110, and/or events 112 so that are ordered to appear earlier in the sort than they might otherwise if the sort were strictly based on the amount of matches to the phrases included in the query of a data store 106.

Figure 2:
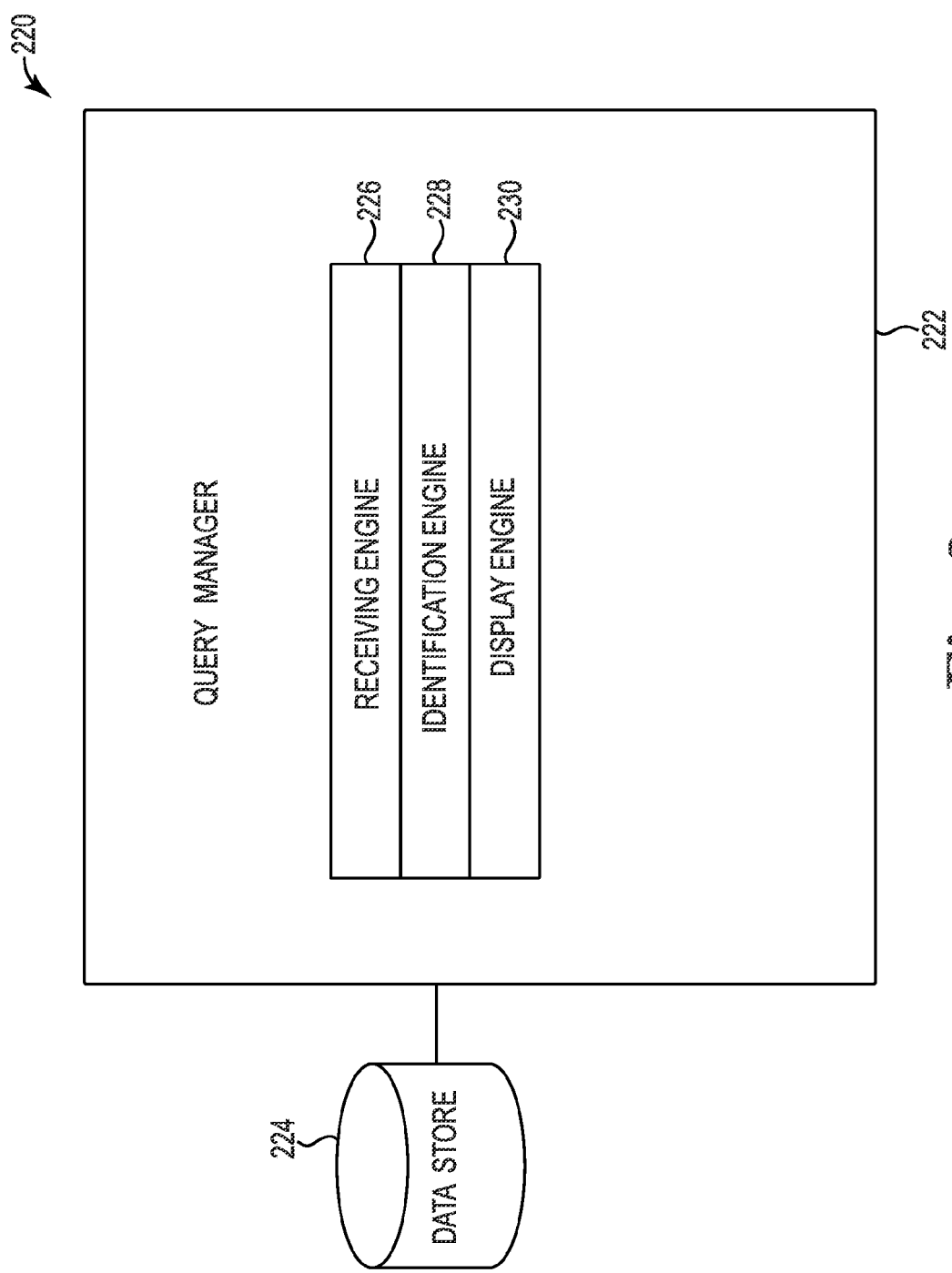
FIG. 2 illustrates a diagram of an example system for querying a data store according to the present disclosure.

FIG. 2 illustrates a diagram of an example system 220 for querying a data store 106 according to the present disclosure. The system 220 can include a data store 224, a query manager 222, and/or a number of engines (e.g., the receiving engine 226, the identification engine 228, and the display engine 230). The query manager can be in communication with the data store 224 via a communication link, and can include, manage, and/or employ the number of engines (e.g., the receiving engine 226, the identification engine 228, and the display engine 230) to perform various functions. The query manager 222 can include additional or fewer engines than illustrated to perform the various functions described herein.

The number of engines (e.g., the receiving engine 226, the identification engine 228, and the display engine 230) can include hardware or a combination of hardware and programming, but at least hardware, to perform a number of functions described herein. For example, the receiving engine 226 can receive a query defined by a phrase. The identification engine 228 can identify within a data store: a service component metric associated with the phrase; a service component log associated with the phrase; and a service component event associated with the phrase. The display engine 230 can cause display of the identified service component metric, the identified service component log, and the identified service component event. The programming can include program instructions (e.g., software, firmware, etc.) stored in a memory resource (e.g., computer readable medium, machine readable medium, etc.) as well as hard-wired program (e.g., logic).

The receiving engine 226 can receive a query. Receiving the query can include receiving the query from a user computing device. The query can be defined by a phrase. The phrase can be received incrementally as it is entered.

Receiving the query can include analyzing and resolving the query. Analyzing and resolving the query can include identifying phrases, portions of phrases, and/or semantic properties of the phrases/portions of phrases. In this manner, a meaning can be attributed to the query. The query can be in a natural language query format. That is, the query can be comprised of phrases that are in a natural language format.

The analysis can further include identifying and/or flagging keywords. Keywords can be phrases that add specificity to and/or narrow the query. A query can be phrased such that it produces a large amount of matching service component metrics, service component logs, and/or service component events, but keywords can narrow the matches to a more manageable amount in a directed manner.

The identification engine 228 can identify within a data store: a service component metric associated with the phrase; a service component log associated with the phrase; and a service component event associated with the phrase. The service component metric, the service component log, and the service component event can each include meta information. Meta information can include the contents of the metric, log, and/or event, names of the metric, log, and/or event, relationships of the metric, log, and/or event, key attributes of the metric, log, and/or event, and tags associated with the metric, log, and/or event.

A tag can include data, for example, in the form of a tag phrase. The tag phrase can include a description of a type of the service component and/or an identifier of a service component metric, log, and/or event. For example, the tag phrase can describe the service component and the metric represented by the service component metric, such as "database" and "transaction rate" for a service component metric representing a measurement of a transaction rate for a specific database being utilized by a specific service.

A key attribute can include a phrase that identifies a specific instance of a service component metric, log, and/or event. For example, a key attribute can include a phrase identifying a specific instance of a specific service component of a specific service associated with a specific metric, log, and/or event. For example, for a service component metric representing a measurement of a transaction rate for a specific database being utilized by a specific service, the key attribute can be a particular database name (e.g., "sales_database_1") identifying the particular instance associated with the metric.

A service component metric can include a measurement of the performance of a constituent component of a service. A service metric can additionally include a metric related to the service (e.g., business metrics, market metrics, financial metrics, key performance indicators related to business, etc. of a service including a component related to managing some aspect of those metrics) The service component metric can include time series data related to the performance of the service component. The service component metric can be specific to an instance of a service component. That is, while the metric itself may be of a type (e.g., a database transaction rate) that is common to many different service components and/or services, the individual service component metric may be specific to a particular instance of the service component (e.g., a database transaction rate for "sales database 1" used by "sales service A"). Therefore, while many service component metrics of the same type can be stored in the data store, each service component metric can be unique to a specific instance of a service component.

A service component log can include log data related to an action of a constituent component of a service to which it is related. The service component log can be associated with a specific instance of a service component. The service component log can include a listing of particular actions that have occurred with respect to a service component. The service component log can be a processed and logged service component event.

A service component event can include event data related to an action of a constituent component of a service. The service component event can be associated with a specific instance of a service component. The service component event can be an action that has occurred with respect to a service component, but that has not been processed and logged as a log. The service component event can be generated in response to an action occurring. For example, a service database component of a service can begin to experience a problem rendering it unavailable for use by its associated service. In response to detecting the problem, a service component event can be generated indicating the service database is experiencing a problem.

Identifying a service component metric, a service component log, and/or a service component event associated with the phrase can include identifying a service component metric, a service component log, and/or a service component event that matches the phrase defining the query. Identifying can include analyzing meta information of the service component metric, service component log, and/or a service component event and identifying phrases within that meta information that match the phrase in the query. For example, if the query includes the phrase "transaction rate," then identifying can include identifying those service component metrics that include the phrase "transaction" and/or "rate" (or something similar) within at least one of the metric, the title of the metric, the type of the metric, a tag of the metric, a key attribute of the metric, etc.

The identification engine 228 can additionally identify a service component metric, a service component log, and/or a service component event associated with the phrase using keywords in the query. Using keywords can accomplish a more directed and/or specific query. For example, a key attribute indicating keyword can be included in the query. The key attribute key word can be "for." A phrase appearing after the key attribute keyword can identify the key attribute. The key attribute can then be used to identify any service component metric, service component log, and/or service component event with a matching key attribute.

Also, the identification engine 228 can identify a service component metric, a service component log, and/or a service component event based on their relationships with one another and/or with a service. For example, the identification engine 228 can include hardware and/or a combination of hardware and programming to identify a service component metric, a service component log, and/or a service component event that have a dependency from a different service component metric, service component log, and/or service component event that has meta information matching a phrase in the query. Therefore, the service component metric, a service component log, and/or a service component event can be identified as associated with a query phrase even if it does not match the query phrase, so long as it shares a relationship with a service component metric, a service component log, and/or a service component event that does match the query phrase. The relationships of the service component metrics, service component logs, a service component events, and or services can be identified by accessing a semantics data store (e.g., a CMDB) including a topological mapping of the relationships.

The display engine 230 can cause display of the identified service component metric, the identified service component log, and the identified service component event. Causing display can include generating a display format for the identified service component metric, the identified service component log, and the identified service component event. Causing display can include transmitting the data to a display device (e.g., an electronic display device) capable of displaying the results of the query (e.g., the identified service component metric, the identified service component log, and the identified service component event) to a user. Causing display can include compiling and/or altering service component metrics, service component logs, and/or service component events. Causing display of a service component metric can include causing display of the service component metric as a time series chart. Causing display of a service component log and/or a service component event can include displaying the service component log and/or a service component event as a table. Causing display can additionally include displaying the identified service component metric, the identified service component log, and/or the identified service component event along with a time filtering option wherein the display engine 230 can include hardware and/or a combination of hardware and programming to receive a specification of a time window of interest and filter the display such that only the identified service component metrics, the identified service component logs, and/or the identified service component events associated with that time period are displayed.

The display engine 230 can highlight problem areas in services, the identified service component metrics, the identified service component logs, and/or the identified service component events being displayed. For example, if a particular exchange server is experiencing problems then the corresponding display chart can display red marked areas indicating that a problem is being experienced.

Figure 3:
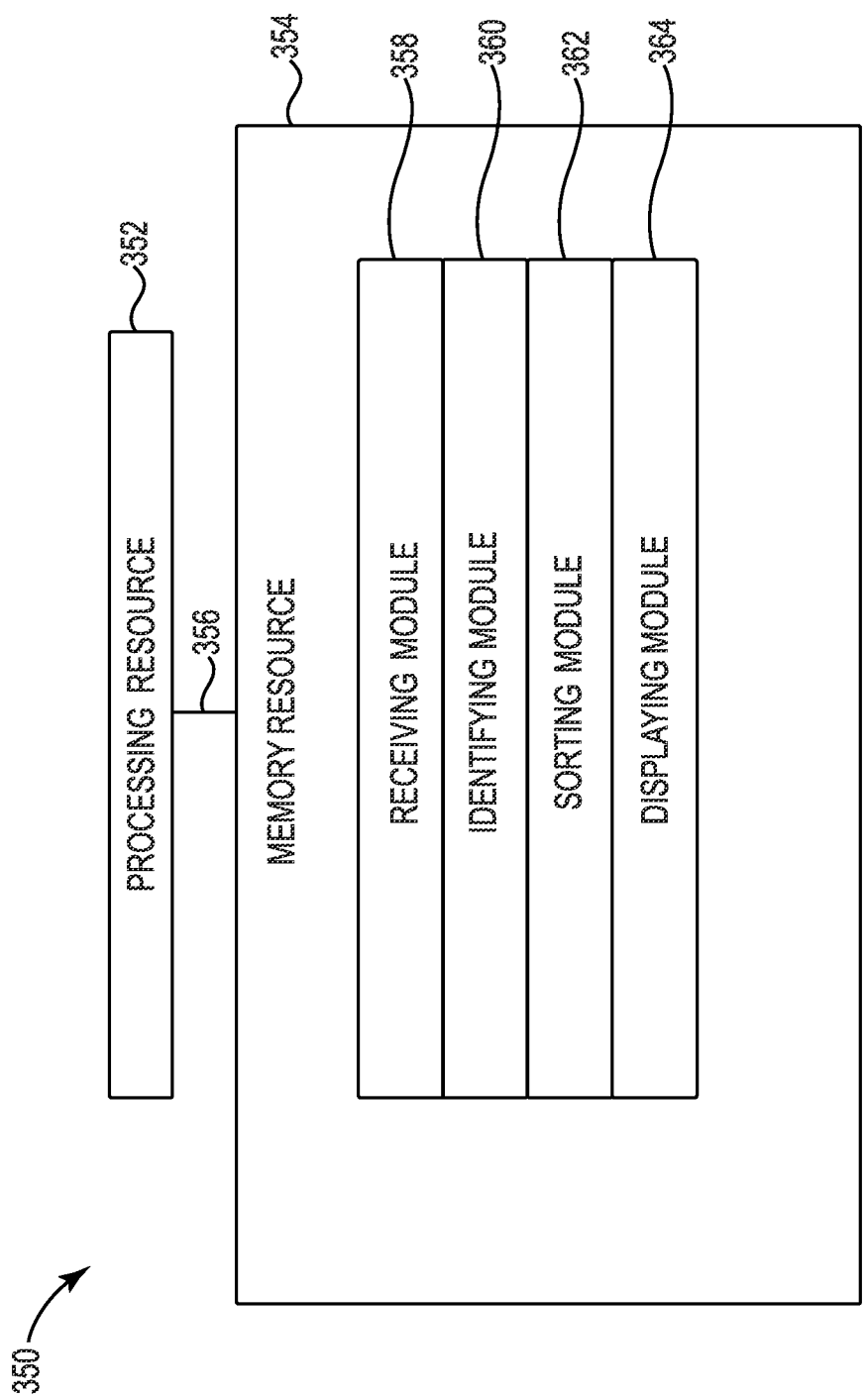
FIG. 3 illustrates a diagram of an example computing device according to the present disclosure.

FIG. 3 illustrates a diagram of an example of a computing device 350 according to the present disclosure. The computing device 350 can utilize software, hardware, firmware, and/or logic to perform a number of functions described herein. The computing device 350 can be any combination of hardware and program instructions to share information. The hardware, for example, can include a processing resource 352 and/or a memory resource 354 (e.g., computer-readable medium (CRM), machine readable medium (MRM), database, etc.). A processing resource 352, as used herein, can include any number of processors capable of executing instructions stored by a memory resource 354. The processing resource 352 may be implemented in a single device or distributed across multiple devices. The program instructions (e.g., computer readable instructions (CRI)) can include instructions stored on the memory resource 354 and executable by the processing resource 352 to implement a desired function (e.g., receive a natural language query defined by a plurality of entered phrases, identify, in a data store, a service component metric, a service component log, and a service component event each associated with at least one of the plurality of entered phrases, sort the identified service component metric, the identified component metric, and the identified service component event, generate a display of the identified service component metric, the identified service component log, and the identified service component event according to the sort, etc.).

The memory resource 354 can be in communication with a processing resource 352. A memory resource 354, as used herein, can include any number of memory components capable of storing instructions that can be executed by the processing resource 352. The memory resource 354 can be a non-transitory CRM or MRM. The memory resource 354 may be integrated in a single device or distributed across multiple devices. Further, the memory resource 354 may be fully or partially integrated in the same device as the processing resource 352 or it may be separate but accessible to that device and the processing resource 352. Thus, it is noted that the computing device 350 may be implemented on a participant device (e.g., host), on a server device, on a collection of server devices, and/or a combination of the participant device and the server device.

The memory resource 354 can be in communication with the processing resource 352 via a communication link (e.g., a path) 356. The communication link 356 can be local or remote to a machine (e.g., a computing device) associated with the processing resource 352. Examples of a local communication link 356 can include an electronic bus internal to a machine (e.g., a computing device) where the memory resource 354 is one of volatile, non-volatile, fixed, and/or removable storage medium in communication with the processing resource 352 via the electronic bus.

FIG. 3 includes a number of modules (e.g., receiving module 358, identifying module 360, sorting module 362, displaying module 364, etc.) that can include CRI that when executed by the processing resource 352 can perform a number of functions. The number of modules can be combined or can be sub-modules of other modules. For example, the identifying module 360 and the sorting module 362 can be sub-modules and/or contained on the same computing device. In another example, the number of modules can comprise individual modules located on separate and distinct memory resources (e.g., CRM, etc.).

Each of the number of modules can include hardware, logic, software and hardware, but at least can include instructions that when executed by the processing resource 352 can function as a corresponding engine, including those as described herein. For example, the receiving module 358 can include instructions that when executed by the processing resource 352 can function as the receiving engine 226. The identifying module 360 can include instructions that when executed by the processing resource 352 can function as the identification engine 228. The sorting module 362 and/or the displaying module 364 can include instructions that when executed by the processing resource 352 can function as the displaying engine 230.

The receiving module 358 can include CRI that when executed by the processing resource 352 can receive a natural language query defined by a plurality of phrases. The plurality of phrases can include a plurality of words or word parts comprised of one or more characters. The characters can be incrementally received and analyzed to identify phrases.

The analysis can further include identifying and/or flagging keywords. Keywords can be phrases that add specificity to and/or narrow the query. A query can be phrased such that it produces a large amount of matching service component metrics, service component logs, and/or service component events, but keywords can narrow the matches to a more manageable amount in a directed manner.

For example, the natural language query can be defined by the phrases "how are the sales databases performing." The phrases "databases" and "performing" in the query can match the meta information tags "database" and "performance" for transaction rate metrics for ten different databases (e.g., database 1-database 10) utilized by a sales service. It may be that the user is only interested in the performance of two instances of the transaction rate metrics (e.g., those associated with database 1 and database 2). Therefore, displaying the transaction rate metrics for all ten databases would overwhelm the user with largely superfluous information. In such an example, the user can include a key attribute indicating key word, such as the phrase "for". A key attribute indicating keyword can be identified and/or flagged causing the phrase and/or phrases immediately following the key attribute indicating keyword to be interpreted as a key attribute. The key attribute can be a phrase that identifies a specific instance and/or subset of instances associated with a unique key attribute. For example, the natural language query can be defined by the phrases "how are the sales databases performing for the email database." The phrases "databases" and "performing" in the query can match the meta information tags "database" and "performance" for transaction rate metrics for ten different databases (e.g., database 1-database 10) utilized by a sales service. However, the phrase "for" can be an key attribute indicating keyword and "the email database" can match a key attribute "email database" specific to only the database 1 and database 2 instances of the transaction rate metrics. Therefore, only service component metrics, service component logs, and/or service component events specific to database 1 and database 2 may be identified.

Further, the user can include a topological indicating key word, such as the phrase "show". A topology indicating keyword can be identified and/or flagged causing the phrase and/or phrases immediately following the topology indicating keyword to be interpreted as a description of a service component type and the phrase and/or phrases immediately preceding the topology indicating keyword to be interpreted as a description of the service. The service can be the service that the query is targeting. For example, the query maybe targeting the email service of an organization. The service component type can be a phrase that identifies a type of component of the service that the query is targeting. For example, the query may be targeting only databases of the email service. Therefore, the natural language query can be defined by the phrases "email service show database." The phrase "email service" can match the meta information title "Email." The phrase "show" can be a topology indicating keyword. The phrase "database" can match a meta information tag "database" for an email service database that has a relationship with the email service established in a semantics data store (e.g., a CMDB). As a result, the query can be interpreted as a query of metrics, logs, and/or events of the email service database.

The identifying module 360 can include CRI that when executed by the processing resource 352 can identify, in a data store, a service component metric, a service component log, and/or a service component event, each associated with at least one of the plurality of entered phrases. For example, if the query is defined by phrases including "disk" and "io" then a service component metric, a service component log, and/or a service component event can be identified that includes meta information matching just "disk," matching just "io," and/or matching "disk" and "io."

Identifying can additionally include identifying a service component metric, a service component log, and/or a service component event associated with at least one of the plurality of entered phrases in a manner implicated by a keyword. For example, identifying a service component metric, a service component log, and/or a service component event matching a key attribute following a key attribute identifying keyword. Additionally, the identifying can include identifying a service component metric, a service component log, and/or a service component event of a service component matching a first query phrase wherein the service component has a relationship to a service matching a second query phrase where a topology indicating keyword is present between the phrases in the query.

The sorting module 362 can include CRI that when executed by the processing resource 352 can sort the identified service component metric, the identified service component log, and the identified service component event. Sorting can include ordering for display the identified service component metric, the identified service component log, and the identified service component event based on their corresponding meta information. That is, sorting can be ordering based on the meta information of the identified service component metric, the identified service component log, and the identified service component event matching at least one phrase of the plurality of phrases defining the query. Sorting can include ordering identified service component metrics, identified service component logs, and identified service component events that are more likely to satisfy the query earlier in the sort. For example, identified service component metrics, identified service component logs, and identified service component events with corresponding meta information matching a greater amount of the plurality of entered phrases defining the query can be given an earlier order. That is, for example, an identified service component metric including meta information such as two tags "disk" and "io" matching two of the phrases "disk" "io" "sales" defining the query can appear earlier in the order (e.g., first) while a second identified service component metric including meta information such as two tags "disk" and "error" matching only one of the phrases "disk" "io" "sales" defining the query can appear later in the order (e.g., second).

Sorting can include key attribute ordering and/or topologically ordering identified service component metrics, identified service component logs, and/or identified service component events for display responsive to the presence of a corresponding keyword in the query. For example, sorting can include key attribute ordering for display responsive to the presence of a key attribute indicating keyword in the query. Key attribute ordering can include ordering the identified service component metrics, identified service component logs, and/or identified service component events with meta information matching a phrase (e.g., a key attribute) immediately following a key attribute indicating keyword earlier than those that do not.

Additionally, sorting can include topologically ordering identified service component metrics, identified service component logs, and/or identified service component events for display responsive to the presence of a topology indicating keyword in the query. Topologically ordering can include ordering for display the identified service component metrics, identified service component logs, and identified service component events based on their relationships with one another and/or their relationships with a service. For example, topologically ordering can include ordering to appear earlier (e.g., first) the identified service component metrics, identified service component logs, and/or identified service component events with meta information matching a first phrase (e.g., a service component type) immediately following a topology indicating keyword in the query and with a relationship (e.g., confirmed via analyses of a semantics data store such as a CMDB) to a second keyword (e.g., a service) immediately preceding the topology indicating keyword in the query.

The sorting module 362 can include CRI that when executed by the processing resource 352 can display the identified service component metric, the identified service component log, and the identified service component event according to the sort. Displaying can include formatting a results page showing the identified service component metric, the identified service component log, and the identified service component event to a user in an order determined by the sort. Displaying can include analyzing and reformatting the identified service component metric, the identified service component log, and the identified service component event to a format different from how each is stored. Reformatting can include generating time series charts, graphs, and/or tables displaying data from a number of identified service component metrics, identified service component logs, and/or identified service component events.

Figure 4:
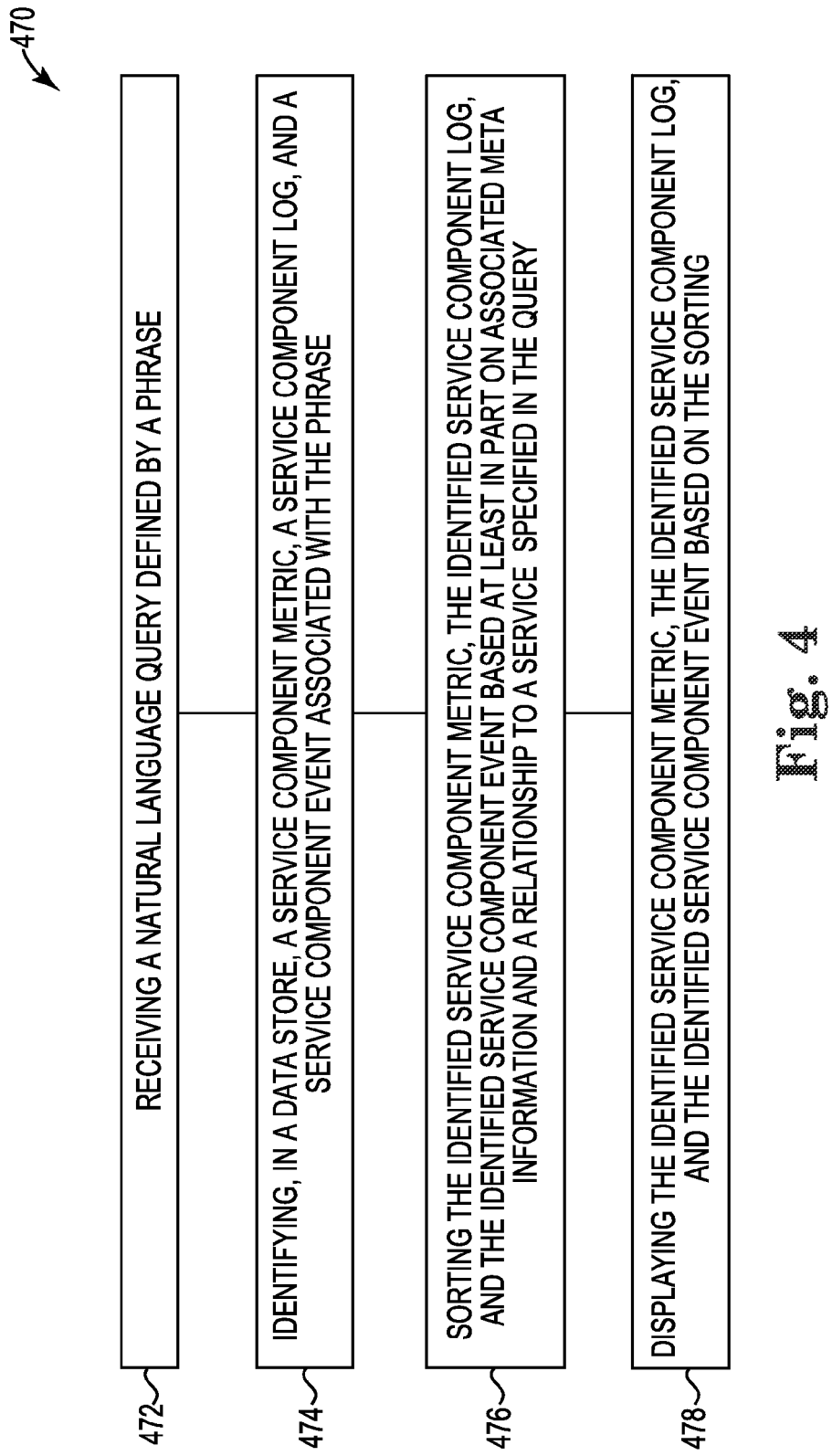
FIG. 4 is a flow chart of an example method for querying a data store according to the present disclosure.

FIG. 4 is a flow chart of an example of a method 470 for querying a data store according to the present disclosure. Method 470 can be performed by a computing device (e.g., computing device 350, previously described in connection with FIG. 3), for instance.

At 472 the method 470 can include receiving a natural language query defined by a phrase. A phrase can include one or more characters forming words and/or word parts. The characters can be incrementally received and analyzed to identify phrases. Some phrases can include keywords that ascribe specific structure to the query.

At 474 the method 470 can include identifying, in a data store, a service component metric, a service component log, and a service component event associated with the phrase. A service component metric, a service component log, and/or a service component event can be associated with the phrase if it included meta information that matches the phrase and/or has a relationship specified by the phrase in relation to a keyword.

At 476 the method 470 can include sorting the identified service component metric, the identified service component log, and the identified service component event based at least in part on associated meta information and a relationship to a service specified in the query. Sorting can include ordering the identified service component metric, the identified service component log, and/or the identified service component event for display. Sorting based on a relationship to a service specified in the query can include determining the relationships of the identified service component metric, the identified service component log, and/or the identified service component event by referencing a semantics data store (e.g., a CMDB) containing a topological mapping of relationships of service component types and services and utilizing that determination in ordering for display.

Additionally, sorting can include ordering for display the identified service component metric, the identified service component log, and/or the identified service component event based on an association with a time frame of interest. For example, the identified service component metric, the identified service component log, and/or the identified service component event that include a metric, log, and/or event that occurred (e.g., determined by a corresponding timestamp) during a window of time specified by a user.

At 478 the method 470 can include displaying the identified service component metric, the identified service component log, and the identified service component event based on the sorting. Displaying can include generating a display of the identified service component metric, the identified service component log, and the identified service component event including query narrowing options. Query narrowing options can include filters (e.g., time windows, metric type, event type, log type, etc.) that can be applied to query to reduce the number of identified service component metrics, identified service component logs, and/or identified service component events. Query narrowing options can additionally include receiving additional phrases defining the query.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N", particularly with respect to reference numerals in the drawings, indicate that a number of the particular feature so designated can be included with a number of examples of the present disclosure. As used herein, "a" or "a number of" something can refer to one or more such things.

What is claimed:

1. A system, comprising:
    a receiving engine to receive a query defined by a phrase, wherein the query is in the form of a natural language query that does not include abbreviations or paths corresponding to data stored in a data store;
    an identification engine to:
        identify within the data store:
            a service component metric associated with the phrase,
            a service component log associated with the phrase, and
            a service component event associated with the phrase;
        identify the service component metric, the service component log, and the service component event do not match the phrase defining the natural language query;
        determine a relationship between the service component metric, the service component log, and the service component event and a service specified in the phrase by referencing a configuration management database (CMDB) containing a topological mapping of relationships; and
        determine the service component metric, the service component log, and the service component event are nonetheless associated with the phrase based on the relationship to the service specified in the phrase; and
    a display engine to cause display of the identified service component metric, the identified service component log, and the identified service component event.

2. The system of claim 1, wherein the service component metric includes time series data related to the performance of an associated service component.

3. The system of claim 1, wherein the service component metric includes a tag describing a type of the service component metric.

4. The system of claim 3, wherein the service component metric includes a key attribute identifying an instance of the service component metric.

5. The system of claim 4, wherein the identification engine identifies the service component metric associated with the phrase based on the service component metric having at least one of a tags and a key attribute matching the phrase.

6. The system of claim 4, wherein the identification engine identifies the service component metric associated with the phrase based on having a key attribute matching a phrase following a key attribute indicating keyword in the query.

7. A non-transitory computer readable medium storing instructions executable by a processing resource to cause a computer to:
    receive a natural language query defined by a plurality of phrases, wherein the natural language query does not include abbreviations or paths corresponding to data stored in a data store;
    identify, in the data store, a service component metric, a service component log, and a service component event, each associated with at least one of the plurality phrases;
    sort the identified service component metric, the identified service component log, and the identified service component event, including ordering the identified component metric, the identified service component log, or the identified service component event to appear earlier in a display responsive to the identified component metric, the identified service component log, or the identified service component event having meta information that matches one of the plurality of phrases that immediately follows a topology indicating keyword in the natural language query; and
    display the identified service component metrics, the identified service component log, and the identified service component event according to the sort.

8. The non-transitory computer readable medium of claim 7, wherein to sort includes to order based on meta information corresponding to the identified service component metric, the identified service component log, and the identified service component event.

9. The non-transitory computer readable medium of claim 8, wherein an identified service component metric, an identified service component log, and an identified service component event including meta information matching a greater amount of the plurality of phrases appear earlier in the order.

10. A method, comprising:
    receiving a natural language query defined by a phrase, wherein the natural language query does not include abbreviations or paths corresponding to data stored in a data store;
    identifying, in the data store, a service component metric, a service component log, and a service component event, each associated with the phrase, including:
        identifying the service component metric, the service component log, and the service component event do not match the phrase defining the natural language query;
        determining a relationship between the service component metric, the service component log, and the service component event and a service specified in the phrase by referencing a configuration management database (CMDB) containing a topological mapping of relationships; and
        determining the service component metric, the service component log, and the service component event are nonetheless associated with the phrase based on the relationship to the service specified in the phrase;

sorting the identified service component metric, the identified service component log, and the identified service component event based at least in part on associated meta information and the relationship to the service specified in the query; and displaying the identified service component metric, the identified service component log, and the identified service component events based on the sorting.

11. The method of claim 10, wherein sorting the identified service component metric, the identified service component log, and the identified service component event includes ordering based on an association with a time frame of interest.

12. The method of claim 10, wherein sorting further comprises ordering a particular service component metric to appear earlier for display than other service component metrics responsive to the particular service component metric having meta information that matches a particular phrase in the natural language query the that immediately follows a topology indicating keyword in the natural language query.

13. The method of claim 10, wherein sorting further comprises ordering a particular service component log to appear earlier for display than other service component logs responsive to the particular service component log having meta information that matches a particular phrase in the natural language query the that immediately follows a topology indicating keyword in the natural language query.

14. The method of claim 10, wherein sorting further comprises ordering a particular service component event to appear earlier for display than other service component events responsive to the particular service component event having meta information that matches a particular phrase in the natural language query the that immediately follows a topology indicating keyword in the natural language query.

15. The method of claim 10, further comprising:

identifying a keyword attribute indicating keyword in the natural language query;

interpreting a particular phrase in the natural language query that immediately follows the keyword attribute indicating keyword as a key attribute that identifies a specific instance of a service component metric, service component log, or service component event associated with the service specified in the phrase of the natural language query.

\* \* \* \* \*